United States Patent
Ramesh et al.

(10) Patent No.: US 11,921,649 B1
(45) Date of Patent: Mar. 5, 2024

(54) MULTIPLE PARALLEL MODE FLASH CHANNELS WITH SERIAL LINK

(71) Applicant: Kioxia Corporation, Tokyo (JP)

(72) Inventors: Tiruvur Radhakrishna Ramesh, San Jose, CA (US); Avadhani Shridhar, San Jose, CA (US); Senthilkumar Diraviam, San Jose, CA (US); Gary Lin, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/569,623

(22) Filed: Sep. 12, 2019

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 5,430,859 A * | 7/1995 | Norman | | G06F 3/0613 |
| | | | | 711/103 |
| 9,690,515 B2 * | 6/2017 | Tuers | | G06F 3/0659 |
| 2003/0051103 A1 * | 3/2003 | Lardner | | G06F 13/1605 |
| | | | | 711/147 |
| 2003/0063604 A1 * | 4/2003 | Wallner | | H04Q 11/0421 |
| | | | | 370/386 |
| 2010/0017562 A1 * | 1/2010 | Nagadomi | | G06F 12/0246 |
| | | | | 711/103 |
| 2010/0082857 A1 * | 4/2010 | Klein | | G06F 13/1684 |
| | | | | 710/51 |
| 2010/0262790 A1 * | 10/2010 | Perego | | G06F 13/1684 |
| | | | | 711/154 |
| 2013/0067138 A1 * | 3/2013 | Schuette | | G06F 3/0616 |
| | | | | 711/103 |
| 2013/0094271 A1 * | 4/2013 | Schuetz | | G11C 16/08 |
| | | | | 365/63 |
| 2013/0132643 A1 * | 5/2013 | Huang | | G06F 13/4022 |
| | | | | 711/103 |
| 2016/0321135 A1 * | 11/2016 | Berman | | G06F 11/1044 |
| 2020/0042471 A1 * | 2/2020 | Kerr | | G06F 13/4291 |
| 2020/0201561 A1 * | 6/2020 | Mun | | G06F 3/0619 |
| 2020/0412545 A1 * | 12/2020 | Liu | | H04L 9/3242 |

* cited by examiner

*Primary Examiner* — Farley Abad
*Assistant Examiner* — Dayton Lewis-Taylor
(74) *Attorney, Agent, or Firm* — Foley & Lardner LLP

(57) ABSTRACT

Various implementations described herein relate to systems and methods for a solid state drive (SSD) that includes a first controller and a NAND package. The NAND package includes a plurality of dies grouped into a plurality of subsets. The NAND package includes a second controller operatively coupled to each of the plurality of subsets via a corresponding one of a plurality of parallel mode channels. The first controller is operatively coupled to the NAND package via a serial link.

20 Claims, 3 Drawing Sheets

MULTIPLE PARALLEL MODE FLASH CHANNELS WITH SERIAL LINK

TECHNICAL FIELD

The present disclosure generally relates to systems and methods for providing serial links to drive multiple NAND dies in a NAND package having multiple parallel mode flash channels.

BACKGROUND

A semiconductor package device may include multiple dies. For example, a flash memory package such as a NAND flash package (or a NAND package) of a solid state drive (SSD), may include multiple NAND flash dies. A controller of the SSD can communicate with the NAND package and manage various functions of the NAND package. In a traditional configuration, an SSD controller uses multiple parallel mode channels for multiple NAND packages each having multiple NAND dies. Parallel mode channels operate according to the Open NAND Flash Interface (ONFI) specifications, Joint Electron Device Engineering Council (JEDEC) JESD 230 NAND Flash Interoperability specification, and Toggle mode NAND flash interface industry specifications. In an example in which an SSD controller uses two parallel mode channels to communicate with 16 NAND dies of a NAND package, each parallel mode channel connects to half (e.g., eight) of the NAND dies. In this example, when a parallel mode channel is operating, only one out of the eight NAND dies can be accessed for data transfer at a given time, thus limiting input/output (I/O) throughput of the SSD.

SUMMARY

In certain aspects, the present implementations of a SSD device are directed to an SSD that includes a first controller and a NAND package. The NAND package includes a plurality of dies grouped into a plurality of subsets. The NAND package includes a second controller operatively coupled to each of the plurality of subsets via a corresponding one of a plurality of parallel mode channels. The first controller is operatively coupled to the NAND package via one or more serial links. In some implementations, the one or more serial links can be full duplex, half duplex, or simplex.

In some aspects, a method includes generating, by a first controller, an identification (ID) for each of a plurality of payloads. The ID indicates one of a plurality of parallel mode interfaces corresponding to each of the plurality of payloads. Each of the plurality of parallel mode interfaces corresponds to one of a plurality of dies in a NAND package. The method further includes transmitting, by the first controller, the plurality of payloads via one or more serial links to the NAND package. Each of the plurality of payloads contains the ID.

In some aspects, a non-transitory computer-readable medium storing computer-readable instructions, such that when executed, causes a controller of an SSD to generating an ID for each of a plurality of payloads. The ID indicates one of a plurality of parallel mode interfaces corresponding to each of the plurality of payloads. Each of the plurality of parallel mode interfaces corresponds to one of a plurality of dies in a NAND package. The controller can transmit the plurality of payloads via one or more serial links to the NAND package. Each of the plurality of payloads containing the ID.

DETAILED DESCRIPTION

Figure 1:
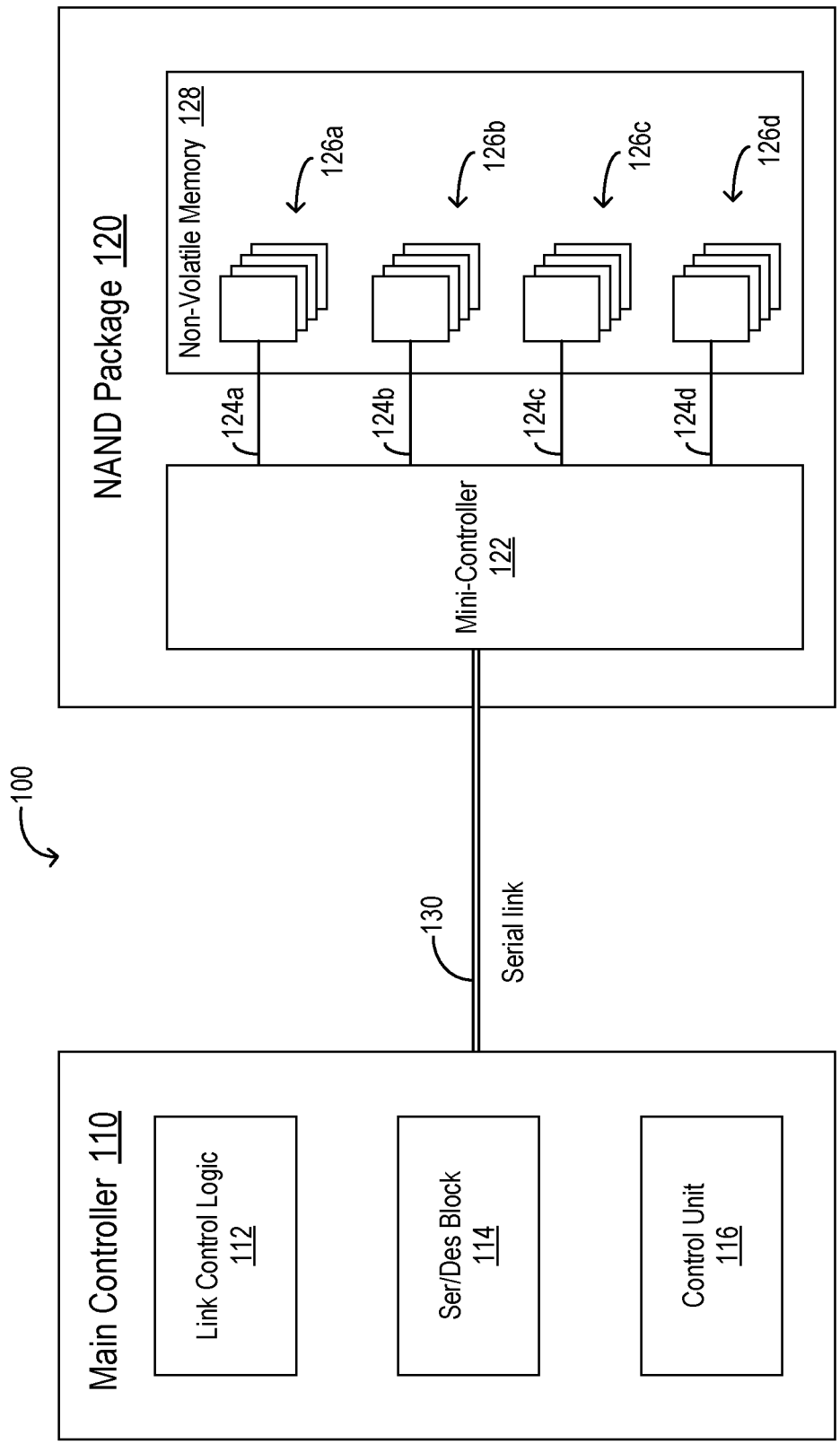
FIG. 1 is a block diagram showing an example SSD, according to some implementations.

Among other aspects, the present disclosure relates to an SSD device having one or more serial links connecting a main controller (referred to as a first controller) to a NAND package. The NAND package includes a mini-controller (referred to as a second controller) in some implementations. The mini-controller is provided on a piece of silicon that connects the serial links to the NAND package. In some implementations, the NAND package includes multiple (e.g., 16) NAND dies. The NAND dies can be grouped in multiple subsets. Each subset includes two or more of the NAND dies of the NAND package. A parallel mode channel is operatively coupled to each subset. For example, the NAND package (having a total of 16 NAND dies) may include four parallel mode channels, each of which is operatively coupled to a subset that contains four NAND dies.

Using a link for communications for additional NAND dies increases the load on that link; increasing the load on a parallel mode channel degrades performance for that channel. In some implementations, a serial link refers to any communication link that does not experience degradation in performance as load on the serial link increases. In other words, the serial link is a link that has constant performance (e.g., operating at a constant speed, which can be with a range of 8 Gb/s-32 Gb/s) regardless of a number of NAND dies for which the serial link is used to communicate. As such, at least one serial link can be used to connect the main controller to the NAND package (e.g., to the mini-controller). In some examples, the at least one serial link corresponds to a single full duplex serial link or a single half duplex serial link. In some examples, the at least one serial link corresponds to two simplex serial links, with one simplex serial link providing a communication channel for downlink communications (e.g., communications from the main controller to the mini-controller) and another simplex serial link providing a communication channel for uplink communications (e.g., communications from the mini-controller to the main controller). In some examples, the at least one serial link corresponds to a combination of two or more full/half duplex serial links, a combination of two or more uplink simplex serial links and two or more downlink simplex serial links, a combination of at least one full/half duplex serial link, at least one uplink simplex serial link, and at least one downlink simplex serial link. Given that the at least one serial link has high, constant performance (with respect to the link between the main controller and the mini-controller), the parallel mode channels (e.g., parallel ONFI mode channels, parallel JEDEC mode channels, parallel toggle mode channels, and so on) connecting the mini-controller to the multiple NAND dies of the NAND package can run at lower speeds in the manner described to conserve power and lower cost of the SSD.

Comparing to traditional configurations in which parallel mode channels are used to connect the NAND package (e.g., the 16 NAND dies) to the main controller, connecting the main controller to the NAND package via the one or more serial links further enables each subset (e.g., four NAND dies) to be independently accessed by the mini-controller (and also the main controller via the one or more serial links) while improving I/O throughput and SSD performance.

Given that the one or more serial links' performance remain constant regardless of a number of NAND dies through which the one or more serial links are used to communicate, the NAND package can be scaled up (e.g., the number of NAND dies in the NAND package can be increased) without modifying the main controller and the one or more serial links. That is, the main controller and the one or more serial links can be used for a NAND package with any number of NAND dies therein without suffering performance issues.

In some examples, to connect the main controller to the NAND dies, the mini-controller is implemented instead of the simple serial or parallel bridge used to conventionally connect the main controller to the NAND dies. The mini-controller can perform most of the data-path and control functionalities for the parallel mode interfaces connected to the NAND dies. Accordingly, the NAND dies are managed by both the main controller and the mini-controller (e.g., NAND functionalities are divided between the main controller and the mini-controller), thus enabling high performance at reduced power.

In some implementations, commands and data to and from the different subsets of the NAND dies in the NAND package are communicated over the one or more serial links simultaneously. That is, commands and data to and from the different subsets can be time division or packet multiplexed and transmitted over the one or more serial links. For example, a control unit of the main controller can generate commands for each parallel mode interface (corresponding to a parallel mode channel and a subset) and interleave the commands for all the parallel mode interfaces in any suitable manner as described herein. The interleaved commands are transmitted over the one or more serial links to the NAND package (e.g., to the mini-controller). In particular, the control unit can generate payloads (which include commands, data, and so on) for the parallel mode interfaces and assign a header or ID to each payload to be transmitted to the mini-controller over the one or more serial links. The mini-controller can interpret the payloads by determining a parallel mode interface corresponding to the header of each payload, and subsequently relaying the payloads to the appropriate parallel mode interfaces independently. As such, parallel access is enabled via the one or more serial links while the performance is improved.

Accordingly, the present disclosure relates to an SSD that uses at least one serial link to communicate with multiple NAND dies (or multiple subsets of NAND dies) in parallel. The at least one serial link operates at a higher speed (e.g., in the range of 8 Gb/s-32 Gb/s) as compared to a parallel mode channel. The at least one serial link is capable of sustaining multiple parallel mode interfaces for parallel operations in the manner described herein. The parallel mode interfaces can run at a lower speed (e.g., less than 533 MT/s) without compromising I/O throughput. Operating the parallel mode interfaces at a lower speed reduces power consumption in the SSD device while the combination of the at least one serial link and the parallel mode interfaces increases overall SSD performance. In order for a conventional SSD controller to achieve similar performance, a parallel mode channel that connects the NAND package to the main controller has to be built for every four NAND dies—a configuration that increases controller cost and power consumption.

FIG. 1 shows a block diagram of an example SSD 100, according to some implementations. Referring to FIG. 1, the SSD 100 includes a main controller 110 (referred to as a first controller) connected to a NAND package 120 via a serial link 130. The main controller 110 includes link control logic 112, a serializer/deserializer (Ser/Des) block 114, and a control unit 116.

In some implementations, the link control logic 112 provides protocol for the serial link 130. For example, the link control logic 112 is configured to provide a high-speed serial protocol for the serial link 130. In some examples, the link control logic 112 can include a signaling protocol for serial transmission of data via the serial link 130.

The Ser/Des block 114 implements a Ser/Des protocol for communicating via the serial link 130. The Ser/Des protocol enables serializing of data to be transmitted via the serial link 130, and deserializing of data received via the serial link 130. In some implementations, the Ser/Des block 114 implements a finite impulse response filter (FIR) at a transmitting side to pre-compensate signals for transmission. The Ser/Des block 114 can implement a decision feedback equalizer (DFE) employing a training phase of equalization at a receiving side. As such, the Ser/Des block 114 enables automatic adjustment of signal lengths and transmission line characteristics of the signal to account for any connectors and printed circuit board traces used between the controller main controller 110 and the NAND package 120.

In some implementations, the control unit 116 can combine raw data storage (e.g., NAND dies 126a-126d) in the NAND package 120 such that the NAND dies 126a-126d function like a single storage. The control unit 116 can include microcontrollers, buffers, flash translation layer (FTL), address mapping table (e.g., a logic-to-physical (L2P) address mapping), and firmware for implementing such functions.

In some implementations, the control unit 116 is a front-end processor/process that interfaces with a host (not shown) through a host interface such as but not limited to, peripheral component interconnect (PCI), PCI express (PCIe), and so on. The host can include any suitable device such as but not limited to, a computing device, storage appliance, and so on. In some examples, the host can be a user device operated by a user. In some implementations, the host and the SSD 100 reside in a datacenter. The datacenter includes a plurality of platforms, each of which can support a plurality of hosts and SSD devices (such as but not limited to, the SSD 100). The control unit 116 can receive host commands/instructions (e.g., read/write commands) and data (to be written) from the host via the host interface, and send data (responsive to read commands) to the host via the host interface.

In some implementations, the control unit 116 includes or is operatively coupled to a memory subsystem (not shown). The memory subsystem is configured to provide buffering capabilities for the data received from the host to be written to the non-volatile memory 128. That is, the data received from the host is first stored in the memory subsystem before being written to the non-volatile memory 128. In some implementations, the memory subsystem includes a volatile memory device having a volatile memory dynamic random-access memory (DRAM) buffer. The volatile memory device can be a single device of a unitary type or multiple devices of different types capable of providing a volatile memory buffer for the SSD 100.

The main controller 110 includes suitable processing and memory capabilities for executing the functions of the link control logic 112, the Ser/Des block 114, and the control unit 116, among other functions. In that regard, the main controller 110 includes one or more processors (e.g., one or more central processing units (CPUs), one or more microprocessors, one or more application-specific integrated circuits (ASICs), one or more field-programmable gate arrays (FPGAs), and so on) and one or more memory devices (e.g., random access memory (RAM), read-only memory (ROM), electrically erasable programmable read-only memory (EEPROM), and so on). In some implementations, the main controller 110 can be implemented as a system-on-chip (SoC).

The NAND package 120 can be a semiconductor package device or an integrated circuit (IC) package. The NAND package 120 includes a non-volatile memory 128. In some implementations, the non-volatile memory 128 can be an array of non-volatile memory dies (e.g., the NAND dies 126a-126d) as shown. The NAND dies 126a-126d can be arranged in a single stack, or in two or more different stacks on the NAND package 120. As shown, the NAND dies 126a form a first subset (e.g., a first group, set, bank, or the like). The NAND dies 126b form a second subset (e.g., a second group, set, bank, or the like). The NAND dies 126c form a third subset (e.g., a third group, set, bank, or the like). The NAND dies 126d form a fourth subset (e.g., a fourth group, set, bank, or the like). In some examples, the NAND dies 126a-126d in each of the four subsets form a 4D stack. While 16 NAND dies 126a-126d are shown in FIG. 1, the non-volatile memory 128 can include any suitable number of non-volatile memory dies (e.g., NAND dies).

In some implementation, the non-volatile memory 128 (e.g., the NAND dies 126a-126d) is NAND flash memory device, which is a non-volatile memory device capable of retaining data without power. Each of the NAND dies 126a-126d has one or more planes. Each plane has multiple blocks, and each block has multiple pages. Data can be written to the pages in a block in consecutive order. Once all the pages are written, no more data is written until the block is erased, whereupon the pages can be written with new data in consecutive order again, and so on.

The NAND package 120 includes a mini-controller 122 (referred to as a second controller). The mini-controller 122 is operatively coupled to multiple (e.g., four) parallel mode channels 124a-124d via corresponding parallel mode interfaces. The mini-controller 122 is connected to the NAND dies 126a-126d via the parallel mode channels 124a-124d. For instance, the mini-controller 122 is connected to the NAND dies 126a via the parallel mode channel 124a. The mini-controller 122 is connected to the NAND dies 126b via the parallel mode channel 124b. The mini-controller 122 is connected to the NAND dies 126c via the parallel mode channel 124c. The mini-controller 122 is connected to the NAND dies 126d via the parallel mode channel 124d.

In some implementations, the parallel mode channels 124a-124d are parallel NAND buses or parallel data buses. Data transfer via the parallel NAND buses or parallel data buses can be performed on a clock edge (synchronously), on edge of a data strobe (asynchronously), or on both edges of a strobe (asynchronous double data rate). In some examples, the parallel mode channels 124a-124d are ONFI mode channels (synchronously for ONFI 2.x or asynchronously for ONFI 3.x and 4.x), as defined in the ONFI specifications.

In some examples, parallel mode channels 124a-124d are JEDEC mode channels, as defined in the JEDEC 230 NAND Flash Interoperability specifications. In some examples, the parallel mode channels 124a-124d are toggle mode channels.

Instead of a simple serial/parallel command translator (e.g., a Ser/Des bridge) as traditionally provided in the NAND package 120, the NAND package 120 includes the mini-controller 122 which can perform flash management functionalities for the NAND dies 126a-126d by communicating with the NAND dies 126a-126d via the parallel mode channels 124a-124d. In some examples, the mini-controller 122 is a silicon of the NAND package 120 that performs functionalities such as but not limited to, error correction code (ECC), flash data-path control, flash interface layer (FTL), data scrambling, data encoding, write on the NAND dies 126a-126d (responsive to a write command received from the main controller 110 via the serial link 130), performing read from the NAND dies 126a-126d (responsive to a read command received from the main controller 110 via the serial link 130), data decoding, data unscrambling, and so on. Such functionalities are performed by the mini-controller 122 instead of the main controller 110. The silicon is connected to all of the NAND dies 126a-126d, or the NAND dies 126a-126d.

In one example, the mini-controller 122 communicates with the NAND dies 126a via the parallel mode channel 124a for executing ECC functions, erasing, monitoring, logging, error handling, garbage collection, wear leveling.

In one example, the mini-controller 122 receives data, a physical address (determined by the control unit 116 based on a L2P mapping), and a write command from the main controller 110 via the serial link 130. The mini-controller 122 encodes and scrambles the data and sends, via the parallel mode channel 124a, the data to one of the NAND dies 126a that corresponds to the physical address to be written.

In one example, the mini-controller 122 receives a physical address (determined by the control unit 116 based on the L2P mapping) and a read command from the main controller 110 via the serial link 130. The mini-controller 122 communicates, via the parallel mode channel 124a, with one of the NAND dies 126a that corresponds to the physical address to retrieve the requested data. The mini-controller 112 receives the data from that NAND die via the parallel mode channel 124a. The mini-controller 122 decodes and unscrambles the data. The mini-controller 122 then sends the decoded data to the main controller 110 via the serial link 130, so that the main controller 110 (e.g., the control unit 116) can transmit the data to the host.

In some examples, the serial link 130 is a link that has constant performance (e.g., operating at a constant speed, which can be in the range of 8 Gb/s-32 Gb/s) regardless of a number (e.g., 16 or more) of the NAND dies 126a-126d for which the serial link 130 is used to communicate. In some examples, the main controller 110 transmits only commands (e.g., read, write, and so on) and data associated with those commands (e.g., data to be written) to the NAND package 120 (e.g., the mini-controller 122) via the serial link 130, where such commands originate from the host. In some examples, only commands and data associated with those commands are communicated via the serial link 130.

In some implementations, the serial link 130 corresponds to one or more serial links. For example, the serial link 130 corresponds to a single full duplex serial link or a single half duplex serial link. A full duplex serial link allows data to be transmitted in both uplink and downlink directions simultaneously. A half duplex serial link allows data to be transmitted in both uplink and downlink directions one direction at a time. In that regard, in the example in which the serial link 130 is a single full/half duplex serial link, both downlink communications (e.g., communications such as commands and/or data from the main controller 110 to the mini-controller 122) and uplink communications (e.g., communications such as commands and/or data from the mini-controller 122 to the main controller 110) are communicated via the same full/half duplex serial link.

In some examples, the serial link 130 corresponds to two simplex serial links, with one simplex serial link providing a communication channel for downlink communications and another simplex serial link providing a communication channel for uplink communications. A simplex serial link allows data to be transmitted in either an uplink direction or a downlink direction. In some examples, the serial link 130 corresponds to a combination of two or more full/half duplex serial links, a combination of two or more uplink simplex serial links and two or more downlink simplex serial links, a combination of at least one full/half duplex serial link, at least one uplink simplex serial link, and at least one downlink simplex serial link.

Using such configuration, each of the parallel mode channels 124a-124d can run at a slow speed (e.g., less than 533 MT/s with ECC), thus reducing power consumption while improving SSD performance. Sustained read latency between the NAND package 120 and the host is improved across all parallel mode channels 124a-124d due to the combination of the ECC being performed in the mini-controller 122 and the high-speed serial link 130 between the main controller 110 and the NAND package 120.

Figure 2A:
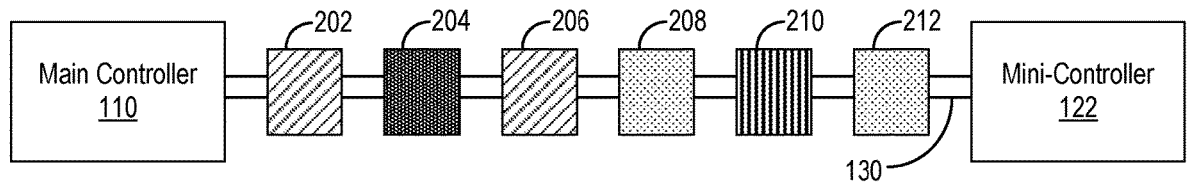
FIG. 2A is a block diagram showing communications from a main controller to a mini-controller, according to some implementations.
Figure 2B:
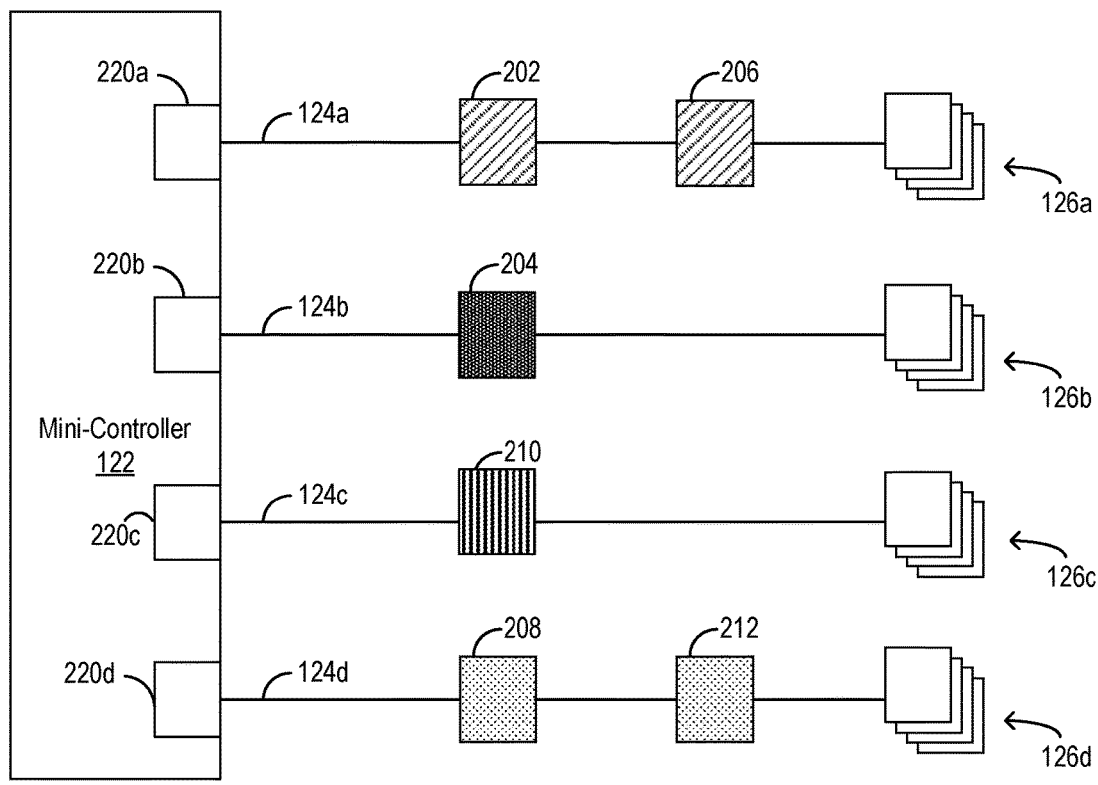
FIG. 2B is a block diagram showing communications from a mini-controller to NAND dies, according to some implementations.

FIG. 2A is a block diagram showing communications from the main controller 110 (FIG. 1) to the mini-controller 122 (FIG. 1), according to some implementations. FIG. 2B is a block diagram showing communications from the mini-controller 122 (FIG. 1) to the NAND dies 126a-126d (FIG. 1), according to some implementations. Referring to FIGS. 1-2B, the main controller 110 can send commands and data (corresponding to those commands) to the mini-controller 122 over the serial link 130. In the example shown in FIG. 2A, the main controller 110 sends payloads 202-212 to the mini-controller 122 via the serial link 130. Each of the payloads 202-212 can be instructions, message, task, package, or the like corresponding to commands and/or data.

The payloads 202-212 for the different parallel mode interfaces 220a-220d (corresponding to the subsets of the NAND dies 126a-126d) can be multiplexed and transmitted over the serial link 130. In some implementations, the mini-controller 122 includes the parallel mode interfaces 220a-220d. The parallel mode interface 220a provides interface functions (FTL) for the NAND dies 126a, and is operatively coupled to the parallel mode channel 124a. The parallel mode interface 220b provides interface functions (FTL) for the NAND dies 126b, and is operatively coupled to the parallel mode channel 124b. The parallel mode interface 220c provides interface functions (FTL) for the NAND dies 126c, and is operatively coupled to the parallel mode channel 124c. The parallel mode interface 220d provides interface functions (FTL) for the NAND dies 126d, and is operatively coupled to the parallel mode channel 124d.

The payloads 202-212 contain commands and/or data corresponding to operations or functionalities of the NAND dies 126a-126d, and is intended to be transmitted to a corresponding one of the parallel mode interfaces 220a-220d. For example, the payload 202 corresponds operations or functionalities of a NAND die of the NAND dies 126a, and is intended to be transmitted to the parallel mode interface 220a. The payload 204 corresponds operations or functionalities of a NAND die of the NAND dies 126b, and is intended to be transmitted to the parallel mode interface 220b. The payload 206 corresponds operations or functionalities of a NAND die of the NAND dies 126a, and is intended to be transmitted to the parallel mode interface 220a. The payload 208 corresponds operations or functionalities of a NAND die of the NAND dies 126d, and is intended to be transmitted to the parallel mode interface 220d. The payload 210 corresponds operations or functionalities of a NAND die of the NAND dies 126c, and is intended to be transmitted to the parallel mode interface 220c. The payload 212 corresponds operations or functionalities of a NAND die of the NAND dies 126d, and is intended to be transmitted to the parallel mode interface 220d.

To identify the corresponding parallel mode interface for each of the payloads 202-212, the mini-controller 122 (e.g., the control unit 116) includes a header or ID in each of the payloads 202-212. In one example, the ID is a binary number that uniquely identifies a corresponding one of the parallel mode interfaces 220a-220d. The ID is in a header of each of the payloads 202-212.

The mini-controller 122 (e.g., the control unit 116) can interleave the payloads 202-212 for all the parallel mode interfaces 220a-220d in any suitable manner. The interleaved payloads 202-212 are transmitted over the serial link 130 to the mini-controller 122 as a serial stream. In some examples, a first payload (e.g., the payload 212) that is generated prior in time is transmitted before a second payload (e.g., the payload 210) that is generated later in time. The mini-controller 122 receives the first payload before receiving the second payload.

The mini-controller 122, responsive to receiving the payloads 202-212, identifies one of the parallel mode interfaces 220a-220d that corresponds to the ID in the header of each of the payloads 202-212. The mini-controller 122 relays the payloads 202-212 to the parallel mode interfaces 220a-220d independently. For example, the mini-controller 122 sends the payloads 202 and 206 to the parallel mode interface 220a. The parallel mode interface 220a can send the payloads 202 and 206 (e.g., when the payloads 202 and 206 contain data to be written) to appropriate NAND dies of the NAND dies 126a. The mini-controller 122 sends the payload 204 to the parallel mode interface 220b. The parallel mode interface 220b can send the payload 204 (e.g., when the payload 204 contains data to be written) to an appropriate NAND die of the NAND dies 126b. The mini-controller 122 sends the payload 210 to the parallel mode interface 220c. The parallel mode interface 220c can send the payload 210 (e.g., when the payload 210 contains data to be written) to an appropriate NAND die of the NAND dies 126c. The mini-controller 122 sends the payloads 208 and 212 to the parallel mode interface 220a. The parallel mode interface 220d can send the payloads 208 and 212 (e.g., when the payloads 208 and 212 contain data to be written) to appropriate NAND dies of the NAND dies 126d.

Given that the mini-controller 122 communicates with the NAND dies 126a-126d via the separate parallel mode channels 124a-124d, and that the interleaved payloads 202-212 are communicated via the serial link 130, parallel access is enabled while the performance of the SSD 100 as a whole is improved.

Figure 3:
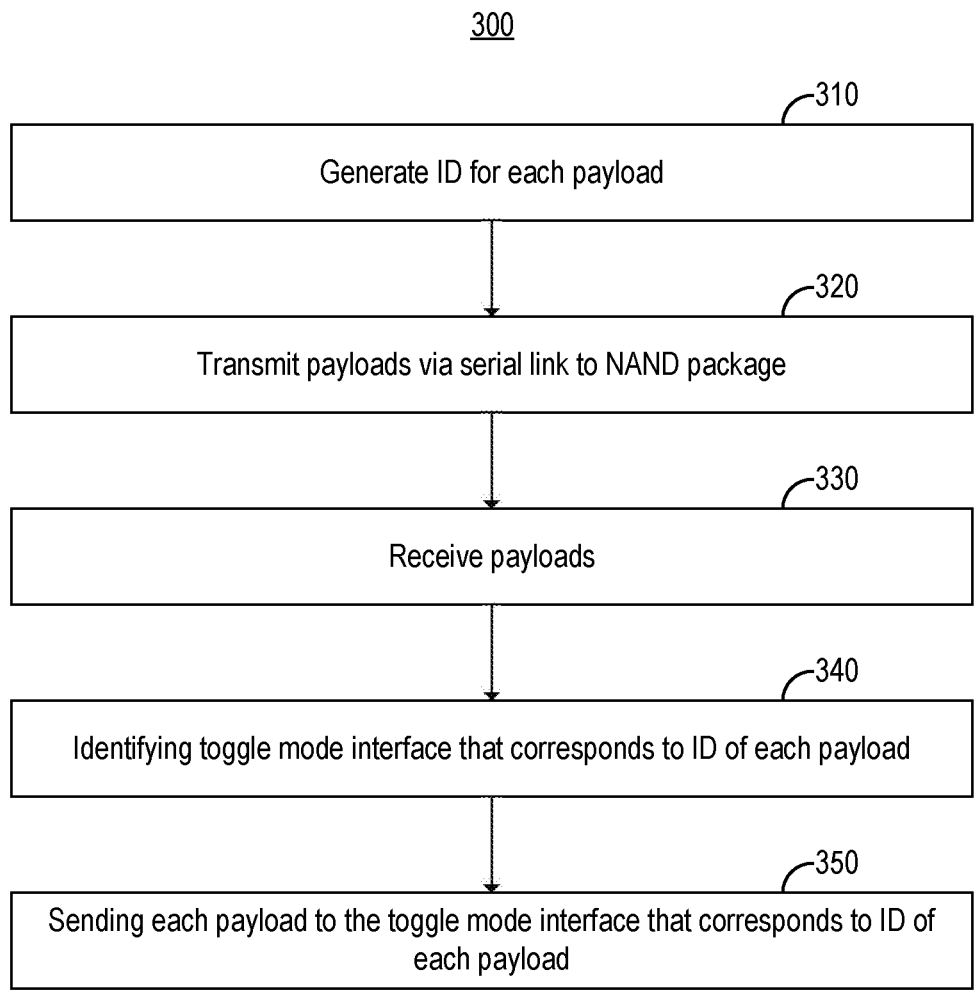
FIG. 3 is a flow diagram illustrating an example process for communicating commands in an SSD, according to some implementations.

FIG. 3 is a flow diagram illustrating an example process for communicating commands in the SSD 100 (FIG. 1), according to some implementations. Referring to FIGS. 1-3, at 310, the main controller 110 generates an ID for each of the payloads 202-212. The ID indicates one of the parallel mode interfaces 220a-220d corresponding to each of the payloads 202-212. Each of the parallel mode interfaces 220a-220d corresponds to one of the NAND dies 126a-126d in the NAND package 120.

At 320, the main controller 110 transmitting the plurality of payloads 202-212 via serial link (e.g., the serial link 130) to the NAND package 120. Each of the payloads 202-212 containing the ID.

At 330, the mini-controller 122 receives the payloads 202-212. At 340, the mini-controller 122 identifies one of the parallel mode interfaces 220a-220d that corresponds to the ID of each of the payloads 202-212. At 350, the mini-controller 122 sends each of the payloads 202-212 to the one of the parallel mode interfaces 220a-220d that corresponds to the ID of each of the payloads 202-212.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A Solid State Drive (SSD), comprising:
   a first controller in the SSD; and
   a NAND package in the SSD, the NAND package comprising a second controller and a plurality of dies grouped into a plurality of subsets, wherein the NAND package further comprises a plurality of parallel mode channels respectively and separately coupled in parallel between each of the plurality of subsets and the second controller,
   wherein the first controller is operatively coupled to the NAND package via a serial link in the SSD, the first controller communicating with the plurality of dies via the serial link, wherein the first controller:
      generates a plurality of payloads, each of the payloads containing data to be written to the NAND package and an identification (ID), the ID indicating one of a plurality of parallel mode interfaces corresponding to each of the plurality of payloads, wherein each of the plurality of parallel mode interfaces respectively corresponds to an individual one of the plurality of dies, wherein the ID contained in each payload generated by the first controller thereby specifies a respective individual one of the plurality of dies as a destination for the each payload, and
      transmits the plurality of payloads to the NAND package via the serial link, wherein:
   each of the plurality of parallel mode interfaces corresponds to one of the plurality of parallel mode channels; and
   the second controller, for the each payload:
      identifies, using the ID in the each payload generated by the first controller, the corresponding one of the plurality of parallel mode channels from among the coupled plurality of parallel mode channels, and
      transmits the data in the each payload to the respective individual one of the plurality of dies via the identified one of the plurality of parallel mode channels independently from the other of the plurality of parallel mode channels.

2. The SSD of claim 1, wherein the first controller is operatively coupled to the second controller via the serial link.

3. The SSD of claim 1, wherein each of the plurality of subsets comprises two or more of the plurality of dies.

4. The SSD of claim 1, wherein the second controller performs, for the plurality of subsets, one or more of error correction code (ECC) functionalities, flash data-path control functionalities, data scrambling functionalities, data encoding functionalities, write functionalities, read functionalities, data decoding functionalities, or data unscrambling functionalities via the plurality of parallel mode channels.

5. The SSD of claim 1, wherein the plurality of parallel mode channels are parallel NAND buses or parallel data buses.

6. The SSD of claim 1, wherein first controller comprises one or more of a host interface, a buffer, a flash translation layer (FTL), or an address mapping table.

7. The SSD of claim 1, wherein each of the plurality of parallel mode channels is running at a lower speed than the serial link.

8. The SSD of claim 1, wherein the NAND package is a semiconductor package device that includes one or more integrated circuit (IC) packages.

9. The SSD of claim 1, wherein the serial link has constant performance regardless of a number of the plurality of dies.

10. The SSD of claim 1, wherein the payload comprises a command.

11. The SSD of claim 1, wherein the ID is in a header of each of the plurality of payloads contains the ID.

12. The SSD of claim 1, wherein
    the second controller receives the plurality of payloads from the first controller via the serial link; and
    the second controller identifies the corresponding one of the parallel mode interfaces that corresponds to the ID of each of the plurality of payloads.

13. The SSD of claim 12, wherein the second controller sends each of the plurality of payloads to the one of the parallel mode interfaces that corresponds to the ID of each of the plurality of payloads.

14. The SSD of claim 1, wherein the serial link comprises one of:
    a single full or half duplex serial link;
    two simplex serial links;
    a combination of two or more full or half duplex serial links;
    a combination of two or more uplink simplex serial links and two or more downlink simplex serial links; and
    a combination of at least one full or half duplex serial link, at least one uplink simplex serial link, and at least one downlink simplex serial link.

15. The SSD of claim 1, wherein
    the first controller transmits to the NAND package via the serial link a first payload containing a first ID and a first data at a first time and a second payload containing a second ID and a second data at a second later time, and wherein
    the second controller, for the first payload identifies a first one of the plurality of parallel mode channels from among the coupled plurality of parallel mode channels based on the first ID, and transmits the first data in the first payload to a first one of the plurality of dies via the identified first parallel mode channel, and wherein
    the second controller, for the second payload identifies a second one of the plurality of parallel mode channels from among the coupled plurality of parallel mode channels based on the second ID, and transmits the second data in the second payload to a second one of the plurality of dies via the identified second parallel mode channel without waiting for completion of transmission of the first data in the first payload to the first one of the plurality of dies.

16. A method of managing storage of data in a solid state drive (SSD), the method comprising:

generating, by a first controller in the SSD, a plurality of payloads, each of the payloads containing data to be written to a NAND package and an identification (ID), the ID indicating one of a plurality of parallel mode interfaces in the SSD corresponding to each of the plurality of payloads, wherein each of the plurality of parallel mode interfaces respectively corresponds to an individual one of a plurality of dies in the NAND package in the SSD, wherein the ID contained in the each payload generated by the first controller thereby specifies a respective individual one of the plurality of dies as a destination for the each payload; and transmitting, by the first controller, the plurality of payloads via a serial link in the SSD to the NAND package, wherein:

the plurality of dies are grouped into a plurality of subsets;

the NAND package comprises a second controller operatively and separately coupled in parallel to each of the plurality of subsets via a corresponding one of a plurality of parallel mode channels, each of the plurality of parallel mode interfaces corresponds to one of the plurality of parallel mode channels; and the second controller identifies, for the each payload, using the ID in the each payload generated by the first controller, the corresponding one of the plurality of parallel mode channels from among the coupled plurality of parallel mode channels, and transmits the data in the each payload to the respective individual one of the plurality of dies via the identified one of the plurality of parallel mode channels independently from the other of the plurality of parallel mode channels.

17. The method of claim 16, further comprising:

receiving, by the second controller, the plurality of payloads via the serial link from the first controller;

identifying, by the second controller, the corresponding one of the parallel mode interfaces indicated by the ID of each of the plurality of payloads; and sending, by the second controller, each of the plurality of payloads to the one of the parallel mode interfaces that corresponds to the ID of each of the plurality of payloads.

18. The method of claim 16, wherein the first controller transmits to the NAND package via the serial link a first payload containing a first ID and a first data at a first time and a second payload containing a second ID and a second data at a second later time, and wherein the second controller, for the first payload identifies a first one of the plurality of parallel mode channels from among the coupled plurality of parallel mode channels based on the first ID, and transmits the first data in the first payload to a first one of the plurality of dies via the identified first parallel mode channel, and wherein the second controller, for the second payload identifies a second one of the plurality of parallel mode channels from among the coupled plurality of parallel mode channels based on the second ID, and transmits the second data in the second payload to a second one of the plurality of dies via the identified second parallel mode channel without waiting for completion of transmission of the first data in the first payload to the first one of the plurality of dies.

19. A non-transitory computer-readable medium storing computer-readable instructions, such that when executed, causes a controller in a Solid State Drive (SSD) to manage storage of data in the SSD, including causing the controller to:

generate a plurality of payloads each containing data to be written to a NAND package and an identification (ID), the ID indicating one of a plurality of parallel mode interfaces corresponding to each of the plurality of payloads, wherein each of the plurality of parallel mode interfaces respectively corresponds to an individual one of a plurality of dies in the NAND package in the SSD, wherein the ID contained in the each of the payloads generated by the controller thereby specifies a respective individual one of the plurality of dies as a destination for the each payload; and transmit the plurality of payloads via a serial link in the SSD to the NAND package, wherein:

the plurality of dies are grouped into a plurality of subsets; and the NAND package comprises a second controller operatively and separately coupled in parallel to each of the plurality of subsets via a corresponding one of a plurality of parallel mode channels, each of the plurality of parallel mode interfaces corresponds to one of the plurality of parallel mode channels; and wherein the second controller identifies, for the each payload, using the ID in the each payload generated by the controller, the corresponding one of the plurality of parallel mode channels from among the coupled plurality of parallel mode channels, and transmits the data in the each payload to the respective individual one of the plurality dies via the identified one of the plurality of parallel mode channels independently from the other of the plurality of parallel mode channels.

20. The non-transitory computer-readable medium of claim 19 wherein the controller transmits to the NAND package via the serial link a first payload containing a first ID and a first data at a first time and a second payload containing a second ID and a second data at a second later time, and wherein the second controller, for the first payload identifies a first one of the plurality of parallel mode channels from among the coupled plurality of parallel mode channels based on the first ID, and transmits the first data in the first payload to a first one of the plurality of dies via the identified first parallel mode channel, and wherein the second controller, for the second payload identifies a second one of the plurality of parallel mode channels from among the coupled plurality of parallel mode channels based on the second ID, and transmits the second data in the second payload to a second one of the plurality of dies via the identified second parallel mode channel without waiting for completion of transmission of the first data in the first payload to the first one of the plurality of dies.

\* \* \* \* \*